(12) United States Patent
Hsueh

(10) Patent No.: US 7,561,356 B2
(45) Date of Patent: Jul. 14, 2009

(54) LENS BARREL

(75) Inventor: Chun-Yu Hsueh, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 19 days.

(21) Appl. No.: 11/869,760

(22) Filed: Oct. 10, 2007

(65) Prior Publication Data

US 2008/0291557 A1 Nov. 27, 2008

(30) Foreign Application Priority Data

May 23, 2007 (TW) .............................. 96118320 A

(51) Int. Cl.
*G02B 7/02* (2006.01)
(52) U.S. Cl. ...................... 359/826; 359/827
(58) Field of Classification Search .................. 359/826, 359/827
See application file for complete search history.

(56) References Cited

U.S. PATENT DOCUMENTS 6,873,472 B2 * 3/2005 Suzuki ........................ 359/699

* cited by examiner

*Primary Examiner*—Jordan M. Schwartz
*Assistant Examiner*—James C Jones
(74) *Attorney, Agent, or Firm*—Thomas, Kayden, Horstemeyer & Risley

(57) ABSTRACT

A lens barrel is disclosed. The lens barrel includes a sleeve having curved groove on an inner side thereof, a lens module having at least one lens and an optical axis having an object end and an image end, and a pin projecting from the lens module and engaged in a curved groove, whereby the lens module is slidably disposed in the sleeve and the sleeve is rotated to move the lens module along the optical axis. The pin has a contact surface contacting the curved groove and a notch is formed on the contact surface.

10 Claims, 4 Drawing Sheets

LENS BARREL

BACKGROUND OF THE INVENTION

1. Field of the Invention

The invention relates to a lens barrel, and in particular relates to a lens barrel preventing the lens from falling off when the lens barrel falls.

2. Description of the Related Art

FIG. 1a is a cross section of a conventional camera with zoom lens. The camera comprises a body 10, a sleeve 20, a lens module 30 and a pin 40. The sleeve 20 is rotatably disposed in the body 10, and a curved groove (not shown) is formed on the inner side of the sleeve 20. The pin 40 is fixed to the lens module 30 and engages the curved groove. When the sleeve 20 rotates, the curved groove moves the pin 40 to move the lens module 30 axially, thereby adjusting the focus length.

When the camera falls accidentally and the lens module 30 impacts the ground, a reaction force is exerted on the lens module 30 in the direction A in FIG. 1b. In such a condition, with the lens module 30 bearing the force of the impact, the pin 40 escapes from the curved groove and is jammed between the lens module 30 and the sleeve 20.

BRIEF SUMMARY OF INVENTION

An embodiment of a lens barrel of the invention comprises a sleeve having curved groove on an inner side thereof, a lens module having at least one lens and an optical axis having an object end and an image end, and a pin projected from the lens module and engaged in the curved groove, whereby the lens module is slidably disposed in the sleeve and the sleeve is rotated to move the lens module along the optical axis. The pin has a contact surface contacted to the curved groove and a notch is formed on the contact surface.

The notch comprises a first plane and a second plane adjacent to the first plane, and the first and second planes are adjacent to the contact surface. The first plane is parallel to the pin, and the second plane is parallel to the pin.

The first plane has a predetermined angle with respect to the pin.

A positioning plane is formed on the contact surface.

The pin is tapered, the contact surface is conical, the curved groove has a tapered cross section corresponding to the contour of the pin.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1A:
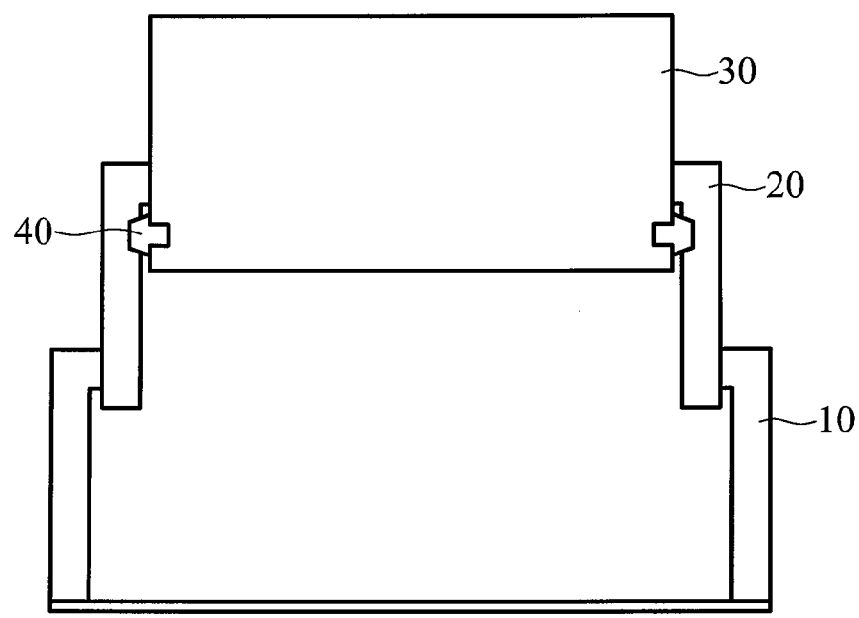
FIGS. 1a and 1b are cross sections of a conventional camera with a zoom lens.
Figure 1B:
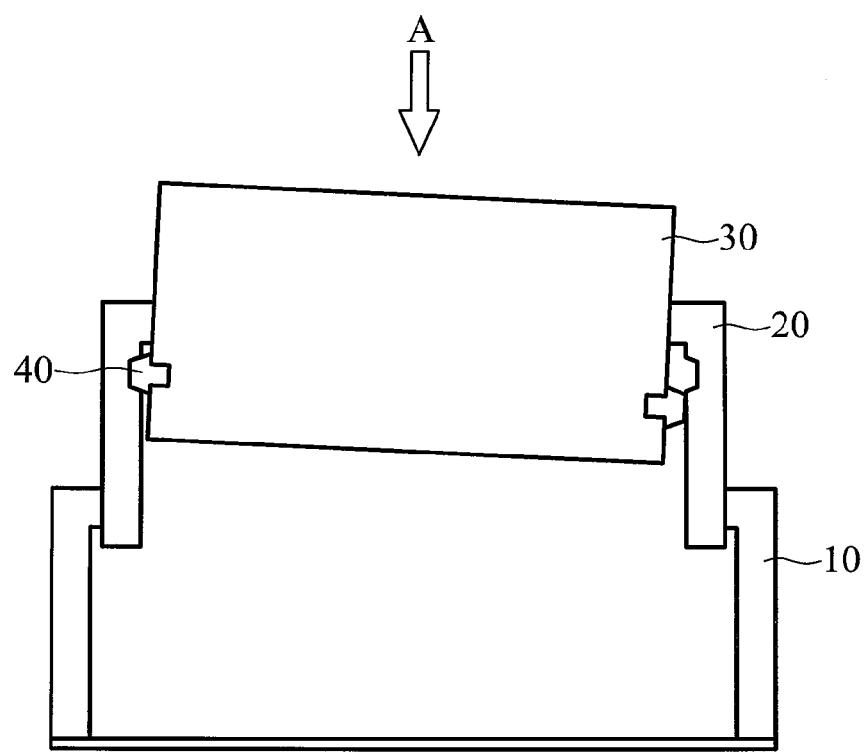
Figure 2:
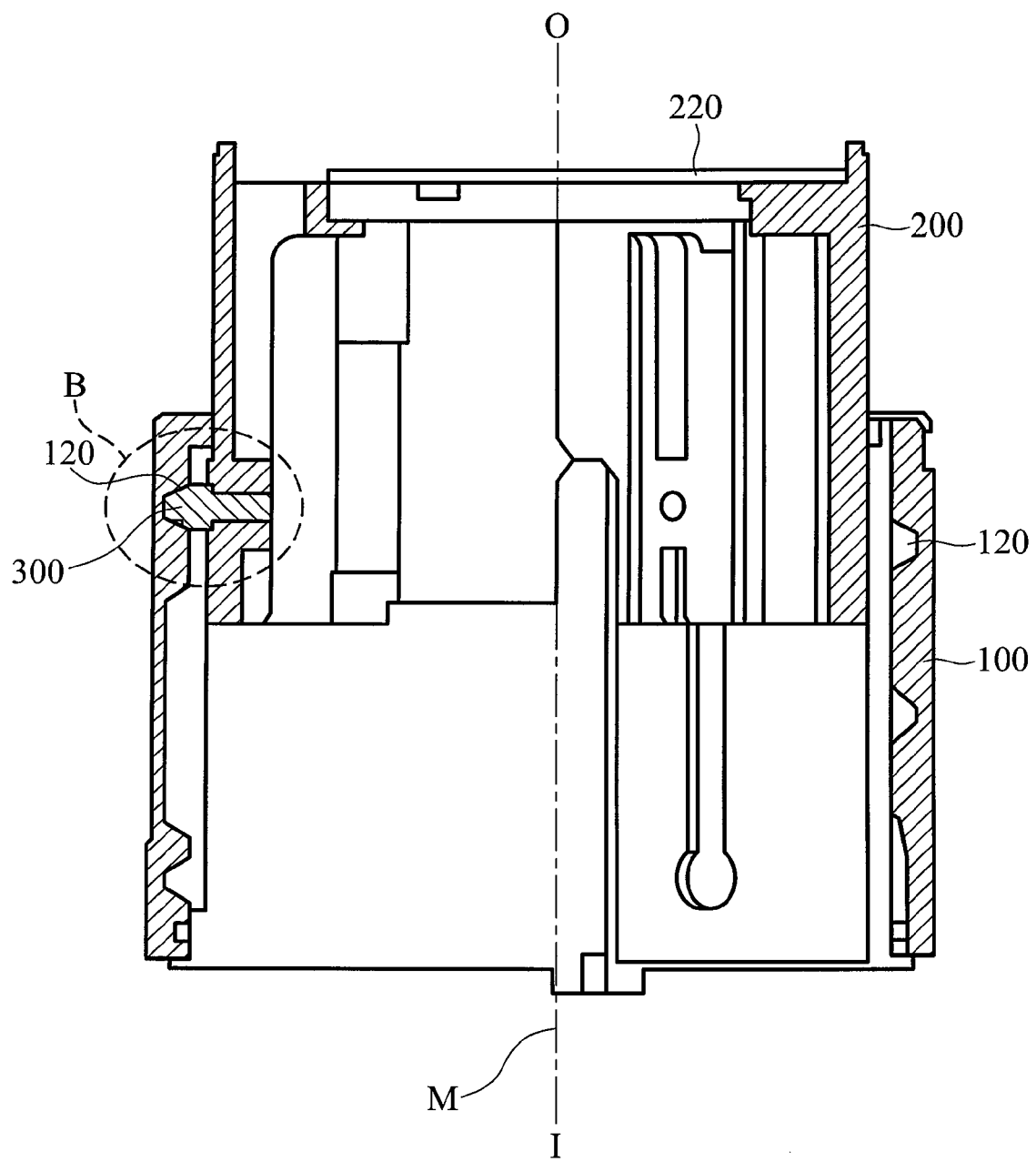
FIG. 2 is a cross section of a lens barrel of the invention.

An embodiment of a lens barrel of the invention is shown in FIG. 2. The lens barrel 1000 comprises a sleeve 100, a lens module 200 and a pin 300. The sleeve 100 is rotatably disposed in a body (not shown). The lens module 200 comprises a lens set 220 and an optical axis M having an object end O and an image end I. The pin 300 is fixed to the lens module 200 and protrudes axially from the lens module 200. The pin 300 is perpendicular to the optical axis M. A curved groove 120 is formed on the inner side of the sleeve 100. The pin 300 engages the curved groove 120. When the sleeve 100 rotates, the curved groove 120 moves the pin 300 to move the lens module 200 along the optical axis M.

Figure 3:
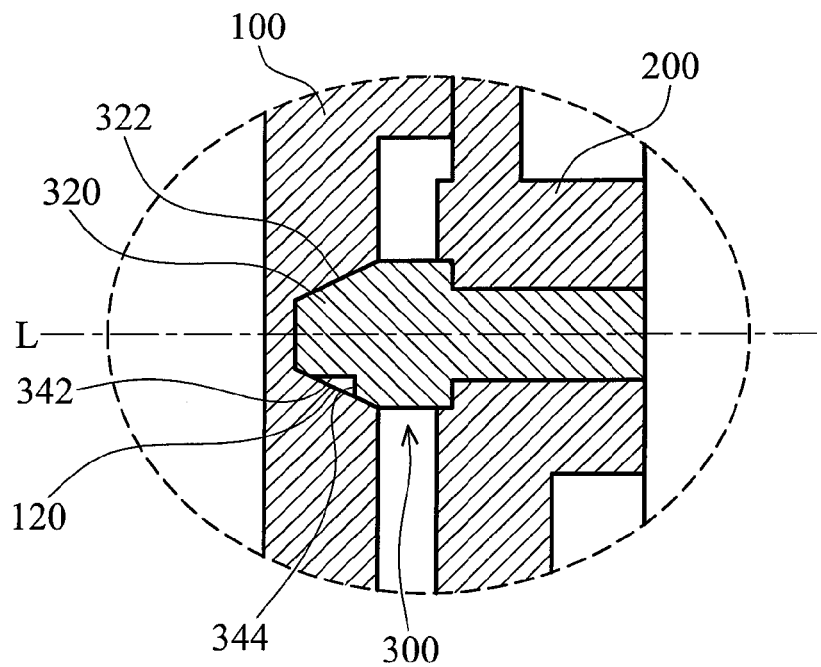
FIG. 3 is a cross section of the B portion of FIG. 2.

Referring to FIG. 3, the pin 300 has an axis L and a tapered head 320 engaging the curved groove 120. The cross section of the curved groove 120 corresponds to the contour of the head 320. The axis L is perpendicular to the optical axis M. The head 320 of the pin 300 has a contact surface 322 which is conical. A notch 340 is formed on the contact surface 322 near the image end I. The notch 340 is defined by a first plane 342 and a second plane 344 adjacent to the first plane 342. When a camera with the lens barrel 1000 falls accidentally and the lens module 200 impacts the ground, the impact causes the pin 300 to deform and enlarge the notch 340, whereby the first plane 340 and the second plane 344 deforms to contact the curved groove 120. The contact area of the pin 300 and the curved groove 120, allows for friction between the pin 300 and the curved groove 120, whereby even if the pin 300 receives impact force, it does not dislodge from the curved groove 120.

In this embodiment, the first plane 342 is parallel to the axis L, and the second plane 344 is parallel to the optical axis L.

Figure 4:
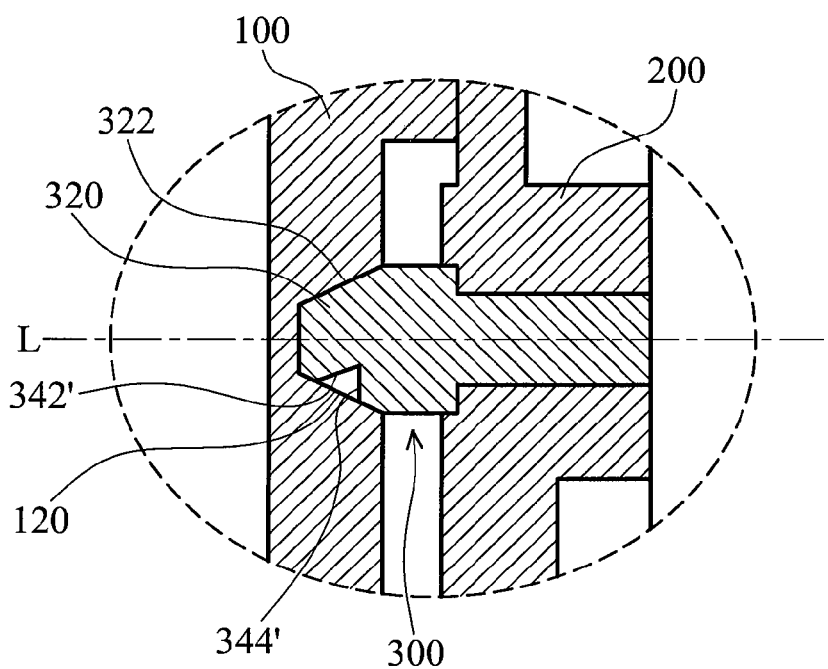
FIG. 4 is a modified embodiment of FIG. 3.

FIG. 4 depicts another embodiment of the invention. In this embodiment, the first plane 342' and the second plane 344' have angles with respect to the axis L rather than being parallel or perpendicular to the axis L.

The angle of the first plane 342 and the second plane 344 is not limited. As long as the contact area of the pin 300 to the curved groove 120 is increased.

Figure 6:
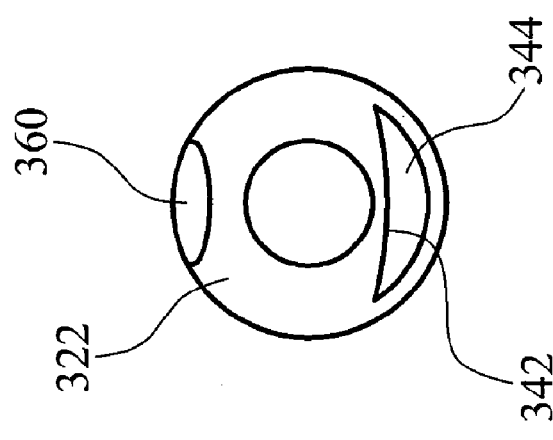
FIG. 6 is a front view of FIG. 5.
Figure 5:
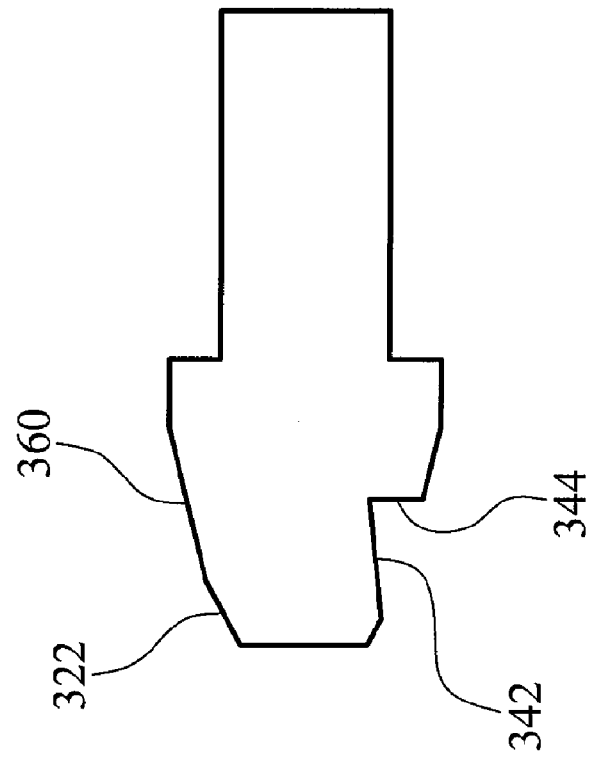
FIG. 5 is a schematic view of a pin with a positioning plane of the invention.

Since the pin 300 is tapered, when the pin 300 receives force impact, the impact force may rotate the pin 300 (twist). A positioning plane 360 is formed on the contact surface 322 by removing a part of the contact surface 322 as shown in FIGS. 5 and 6. The positioning plane 360 abuts the curved groove 120 to prevent the pin 300 from rotating.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens barrel, comprising:

a sleeve having a curved groove on an inner side thereof;

a lens module having at least one lens and an optical axis having an object end and an image end;

a pin projecting from the lens module and engaging the curved groove, whereby the lens module is slidably disposed in the sleeve and the sleeve is rotated to move the lens module along the optical axis, wherein the pin has a contact surface contacting the curved groove and a notch is formed on the contact surface; and a positioning plane is formed on the contact surface;

wherein the notch is formed on the image end and the positioning plane is formed on the object end.

2. The lens barrel as claimed in claim 1, wherein the notch comprises a first plane and a second plane adjacent to the first plane, and the first and second planes are adjacent to the contact surface.

3. The lens barrel as claimed in claim 2, wherein the first plane is parallel to the pin.

4. The lens barrel as claimed in claim 3, wherein the second plane is parallel to the pin.

5. The lens barrel as claimed in claim 2, wherein the first plane has a predetermined angle with respect to the pin.

6. The lens barrel as claimed in claim 1, wherein the pin is tapered, the contact surface is conical, and the curved groove has a tapered cross section corresponding to the contour of the pin.

7. The lens barrel as claimed in claim 1, wherein the pin is perpendicular to the optical axis.

8. The lens barrel as claimed in claim 1, wherein the notch is formed on the image end.

9. The lens barrel as claimed in claim 1, wherein the notch is formed on the object end.

10. A lens barrel, comprising:

a sleeve having a curved groove on an inner side thereof;

a lens module having at least one lens and an optical axis having an object end and an image end;

a pin projecting from the lens module and engaging the curved groove, whereby the lens module is slidably disposed in the sleeve and the sleeve is rotated to move the lens module along the optical axis, wherein the pin has a contact surface contacting the curved groove and a notch is formed on the contact surface; and a positioning plane is formed on the contact surface;

wherein the notch is formed on the object end and the positioning plane is formed on the image end.

* * * * *